(12) United States Patent
Tobin

(10) Patent No.: US 6,540,288 B1
(45) Date of Patent: Apr. 1, 2003

(54) LOW PROFILE VEHICLE ESCAPE HATCH ASSEMBLY

(75) Inventor: James R. Tobin, Charlotte, NC (US)

(73) Assignee: Specialty Manufacturing Company, Pineville, NC (US)

( * ) Notice: Subject to any disclaimer, the term of this patent is extended or adjusted under 35 U.S.C. 154(b) by 0 days.

(21) Appl. No.: 10/010,922

(22) Filed: Nov. 8, 2001

(51) Int. Cl.⁷ .................................................. B60J 7/00
(52) U.S. Cl. ................................... 296/216.02; 49/141
(58) Field of Search ........................ 296/216.01, 216.02, 296/218, 224, 216.03, 216.06, 216.07; 49/141; 292/DIG. 5; 454/129, 136

(56) References Cited

U.S. PATENT DOCUMENTS

| | | | |
|---|---|---|---|
| 3,936,086 A | 2/1976 | Berkowitz | 292/341.17 |
| 3,975,049 A | 8/1976 | Niessner | |
| 3,979,148 A | 9/1976 | Martin | |
| 4,021,073 A | 5/1977 | Manning | |
| 4,121,870 A * | 10/1978 | Oakey | 296/218 |
| 4,183,576 A * | 1/1980 | Frymire | |
| 4,283,885 A | 8/1981 | Remick et al. | 49/466 |
| 4,412,404 A | 11/1983 | Manning | 52/19 |
| 4,433,506 A | 2/1984 | Manning | 49/141 |
| 4,495,731 A | 1/1985 | Sears | 49/402 |
| 4,519,645 A | 5/1985 | Kelly et al. | 296/224 |
| 4,592,269 A | 6/1986 | Lamparter | |
| 4,895,065 A | 1/1990 | Lamparter | |
| 4,950,018 A | 8/1990 | Jeffords et al. | 292/6 |
| 4,964,673 A | 10/1990 | Lamparter | |
| 5,054,377 A | 10/1991 | Mochel et al. | |
| 5,137,327 A * | 8/1992 | Edmonds et al. | 296/216.02 X |
| 5,255,479 A | 10/1993 | Shepherd | 52/127.8 |
| 5,535,551 A | 7/1996 | Falk et al. | 49/324 |

FOREIGN PATENT DOCUMENTS

| | | | | |
|---|---|---|---|---|
| DE | 001240424 | * | 5/1967 | 296/216.02 |
| GB | 1011168 | * | 11/1965 | 296/216.02 |

* cited by examiner

Primary Examiner—Dennis H. Pedder
(74) Attorney, Agent, or Firm—Kennedy Covington Lobdell & Hickman, LLP

(57) ABSTRACT

An escape hatch assembly mountable in an opening in the roof of a vehicle which includes a frame member having an egress opening defined by upstanding side walls that are arranged to extend upwardly into the opening in the roof of the vehicle, a flange member extending outwardly from the lower portion of said frame member and arranged to abut the inside surface of the roof of the vehicle; and attachment elements for securing the flange member to the inside surface of the roof of the vehicle. A method of installing the escape hatch upwardly through an opening the roof of a vehicle is also disclosed.

12 Claims, 8 Drawing Sheets

LOW PROFILE VEHICLE ESCAPE HATCH ASSEMBLY

BACKGROUND OF THE INVENTION

The present invention relates generally to escape hatch assemblies of the type that can be mounted in vehicles, and more particularly to escape hatch assemblies of this type that are mounted in the roof of the vehicle to permit persons within the vehicle to escape in an emergency situation.

It is well known to provide escape hatch assemblies in an opening formed in the roof of vehicles, such as buses, and these escape hatch assemblies are normally in a closed position to seal such opening. A mechanism is usually provided that permits occupants inside the vehicle to open the escape hatch member in an emergency where the doors of the vehicle are not accessible, and to escape through the opening. In many cases these conventional escape hatch assemblies are also provided with a mechanism that permits the escape hatch member to be partially opened to ventilate the inside of the vehicle.

These conventional escape hatch assemblies have two significant disadvantages. First, the procedure for mounting the escape hatch assembly in the roof of the vehicle is somewhat time consuming and labor intensive. Also, once installed, the escape hatch assembly has a relatively high profile (e.g. 2.5 inches) above the top surface of the vehicle that exposes it to possible damage.

More specifically, conventional escape hatches are mounted from the outside of the vehicle by hoisting the escape hatch assembly up through the opening in the top of the vehicle and temporarily manually holding the escape hatch assembly in place, and this requires two people in many cases. Then, the escape hatch assembly is attached to the top wall of the vehicle using rivets, screws, adhesives and the like, and this procedure is carried out from outside the vehicle. Finally, the installer(s) go back inside the bus to attach a piece of trim around the inside surface of the escape hatch assembly.

Once the escape hatch assembly is installed, the frame portion of the assembly, which is mounted to the top surface of the roof of the vehicle, protrudes upwardly through the roof of the vehicle for several inches above the outer surface of the roof, and the escape hatch member is positioned on top of this upwardly extending portion of the frame. The result is that the upper portion of the escape hatch assembly extends upwardly above the outer surface of the roof in an exposed position. Moreover, the attachment screws, adhesives, etc. are located at an exposed position on the outside of the roof of the vehicle, and, as a result, mechanical fasteners such as screws can rust, and adhesives can deteriorate because they are constantly exposed to weather conditions. Another disadvantage of known escape hatch assemblies is that they usually require two sealing members, one between the frame member of the escape hatch and the roof of the vehicle and one between the frame member and the escape hatch member of the escape hatch assembly.

This exposed position of the roof hatch assembly can present a safety problem. If the vehicle is in an accident and rolls over so that the top of the vehicle strikes the ground or road, the exposed escape hatch may be damaged to an extent that it becomes inoperative and incapable of performing its intended function of permitting the occupants in the vehicle to escape through the escape hatch assembly. In some cases, the vehicles may have roll bars that extend vertically above the roof of the vehicle, but conventional escape hatch assemblies have a vertical extent above the top of the roof of the bus that is greater than that of the roll bars. Moreover, because some vehicles are being made with an increased vertical height, the exposed escape hatch assembly may also become damaged because the exposed portion of the escape hatch assembly will strike low hanging obstacles that are in the path of the exposed portion, such as, for example, highway overpasses, awnings of hotel entrances, and tree limbs.

The escape hatch assembly of the present invention overcomes or ameliorates these disadvantages of conventional escape hatch assemblies, and provides an escape hatch assembly that can be installed easily and quickly at a reduced cost, and, once installed, the exposed portion of the escape assembly has a significantly reduced profile that improves its safety characteristics and it also provides better sealing characteristics between the roof of the vehicle and the escape hatch assembly.

SUMMARY OF THE INVENTION

In accordance with the present invention, an escape hatch assembly is provided which is mountable in an opening in the roof of a vehicle, and this escape hatch includes a frame member having an egress opening defined by upstanding side walls that are arranged to extend upwardly through the opening in the roof of the vehicle, and includes a flange member extending outwardly from the lower portion of the frame member and arranged to abut the inside surface of the roof of the vehicle. Attachment devices are provided for securing the flange member to the inside surface of the roof of the vehicle. An escape hatch member is attached to the frame member for movement between a closed position at which the escape hatch member closes the egress opening above the frame member by directly engaging a resilient sealing member, and an open position spaced from the frame sufficiently to permit egress of persons through the egress opening in the frame member.

In a preferred embodiment of the escape hatch assembly of the present invention, the resilient sealing member is arranged to extend around the perimeter of a hole cut in the roof of the vehicle adjacent the upstanding side walls of the frame member. Additionally, the escape hatch member may be attached to the frame member by a hinge mechanism that permits the escape hatch member to be pivoted between its first and second positions, and the flange member may include openings therein disposed to permit attachment screws to be screwed upwardly into the inside surface of the roof of the vehicle. Finally, it is preferred that the outward extent of the escape hatch assembly above the top surface of the roof of the vehicle does not exceed one inch.

The present invention also provides a method of installing an escape hatch assembly in an opening formed in the roof of a vehicle, which method, briefly summarized, includes the steps of mounting a resilient sealing ring around the edge of the opening in the roof of the vehicle; moving an upper portion of the escape assembly upwardly through the opening in the roof of the vehicle from inside the vehicle; and attaching the lower portion of the escape hatch assembly to the inside surface of the roof of the vehicle from inside the vehicle.

This method, preferably, may also include the steps of pivoting the escape hatch member away from the frame member; then moving the escape hatch member and frame member upwardly into the opening in the roof of the vehicle from inside the vehicle; pivoting the escape hatch member from inside the vehicle to its closed position generally adjacent the frame member; temporarily supporting the escape hatch assembly in the opening by positioning the escape hatch member so that it rests on the resilient sealing member on the roof of the vehicle, and then actuating linkage mechanisms to more securely hold the escape hatch assembly in place before the escape hatch assembly is attached to the inside surface of the roof of the vehicle.

DESCRIPTION OF THE PREFERRED EMBODIMENT OF THE PRESENT INVENTION

Figure 1:
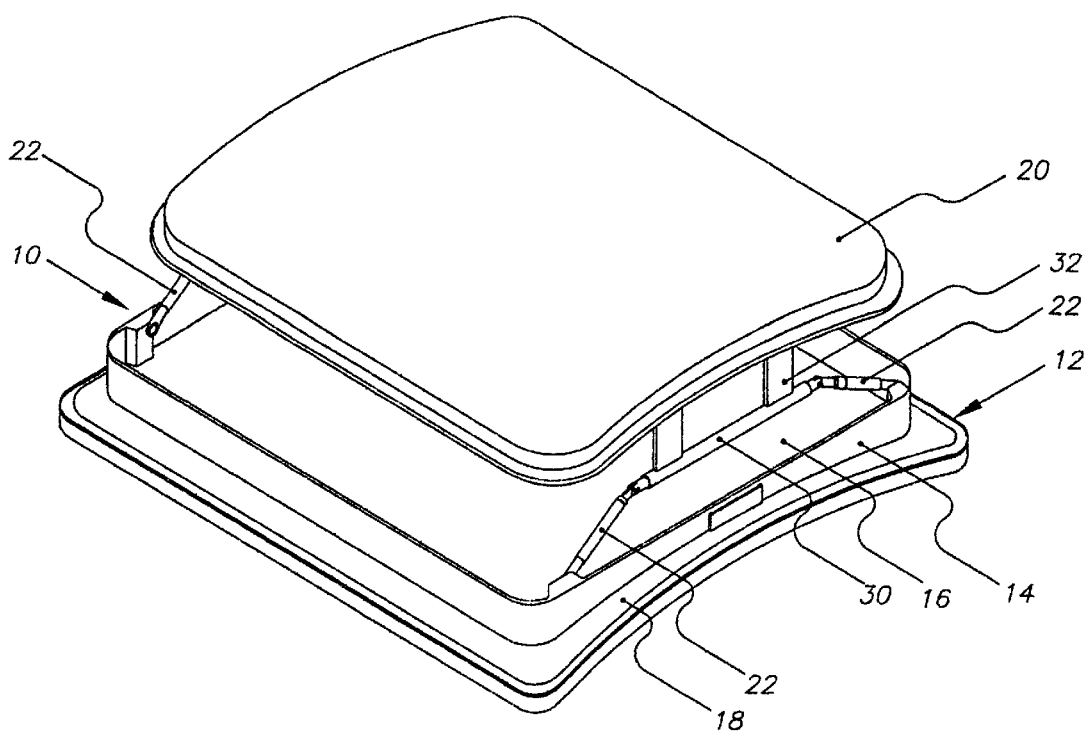
FIG. 1 is a perspective view looking generally down on an escape hatch assembly according to a preferred embodiment of the present invention.
Figure 2:
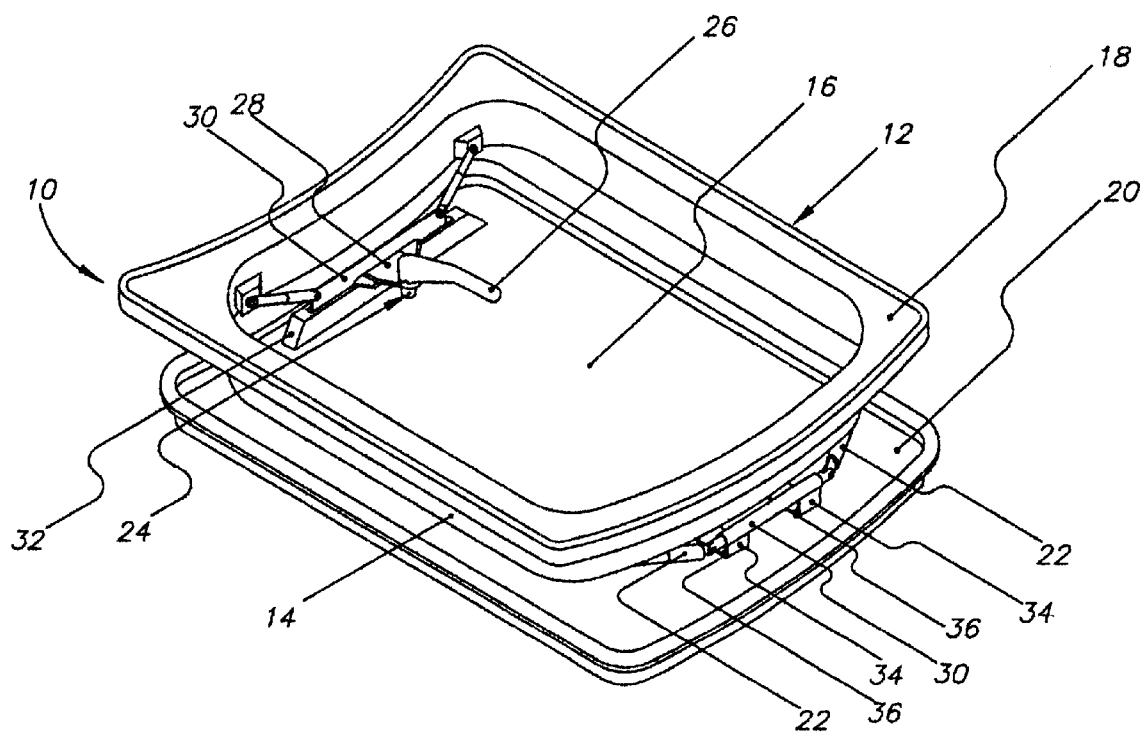
FIG. 2 is a perspective view looking generally up to the escape hatch illustrated in FIG. 1.

Looking now in greater detail at the accompanying drawings, FIGS. 1 and 2 illustrate an escape hatch assembly 10 according to a preferred embodiment of the present invention. The escape hatch assembly 10 includes a frame member 12 formed with vertically upstanding wall portions 14 that are generally rectangular in shape and define an egress opening 16. The frame 12 also includes a flange member 18 that extends outwardly from the bottom or lower portion of the upstanding wall portions 14, and this flange member 18 has a slight curvature that corresponds generally to the curvature of the inside surface of the roof of a vehicle into which the escape hatch assembly 12 is to be installed as described in greater detail below.

Figure 5:
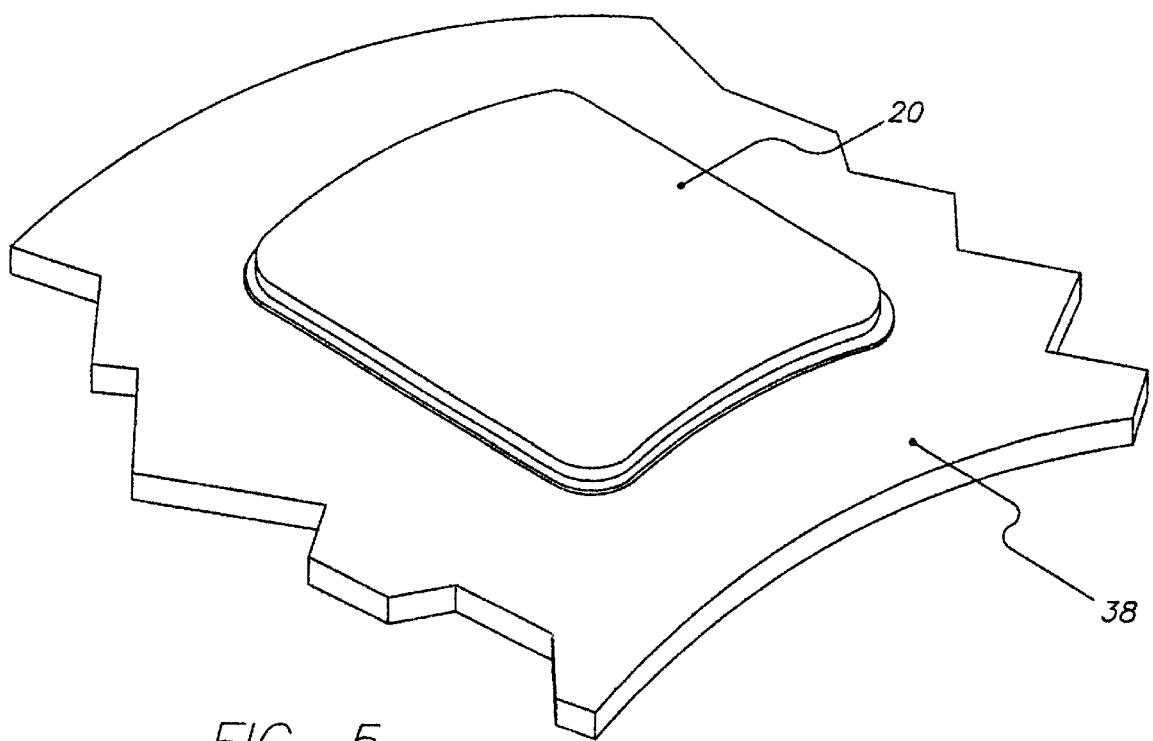
FIG. 5 illustrates another step of the method of installing an escape hatch assembly in accordance with the present invention.

The escape hatch assembly 10 also includes an escape hatch member 20 that is attached to the frame 12 by a pair of conventional linkages 22 which are well known in the art, and which can be manually operated to raise and lower the respective ends of the escape hatch member 20 relative to the frame 12. As is well known in the art, either linkage can be operated to raise only one of the sides of the escape hatch member 20 relative to the frame 12 to permit ventilating air to pass into the vehicle through that side of the escape hatch member 20, or both linkages 22 can be manually operated to move the escape hatch member 20 between a raised or open position for full ventilation as illustrated in FIG. 1 or a lowered or closed position abutting the frame 12 as illustrated in FIG. 5. The escape hatch member 20 preferably has a curvature that is equal to or slightly tighter than the curvature of the outside surface of the roof of the vehicle for a purpose to be described in greater detail below.

As best seen in FIG. 2, one of the linkages 22 are attached to a release mechanism 24 that is also conventional, and that includes a release handle 26 pivotally mounted on a flange 28. As well known in the art, when the handle 26 is pivoted to an opening position, the connecting member 30 that extends between the two linkage elements in the linkage element 22 is released from the upstanding support 32 that is attached to the inside surface of the escape hatch member 20. At the other end of the escape hatch member 20, the connecting linkage member 30 is mounted on a pair of pivot flanges 34, each of which is mounted to the escape hatch member 20 by a hinge mechanism 36.

Accordingly, when the handle 26 is pivoted to an opening position, the end of the escape hatch member 20 which is at the rear of the vehicle separates from the support 32, and the hinge mechanisms 36 are positioned relative to the frame 12 so that the escape hatch member 20 can be readily pivoted about the hinge mechanisms 36 until the escape hatch member 20 is pivoted more than ninety degrees about the hinge mechanism 36 so that it is fully opened to permit passengers in the vehicle to leave the vehicle through the egress opening 16 in the upstanding wall portions 14 of the frame 12.

Figure 3:
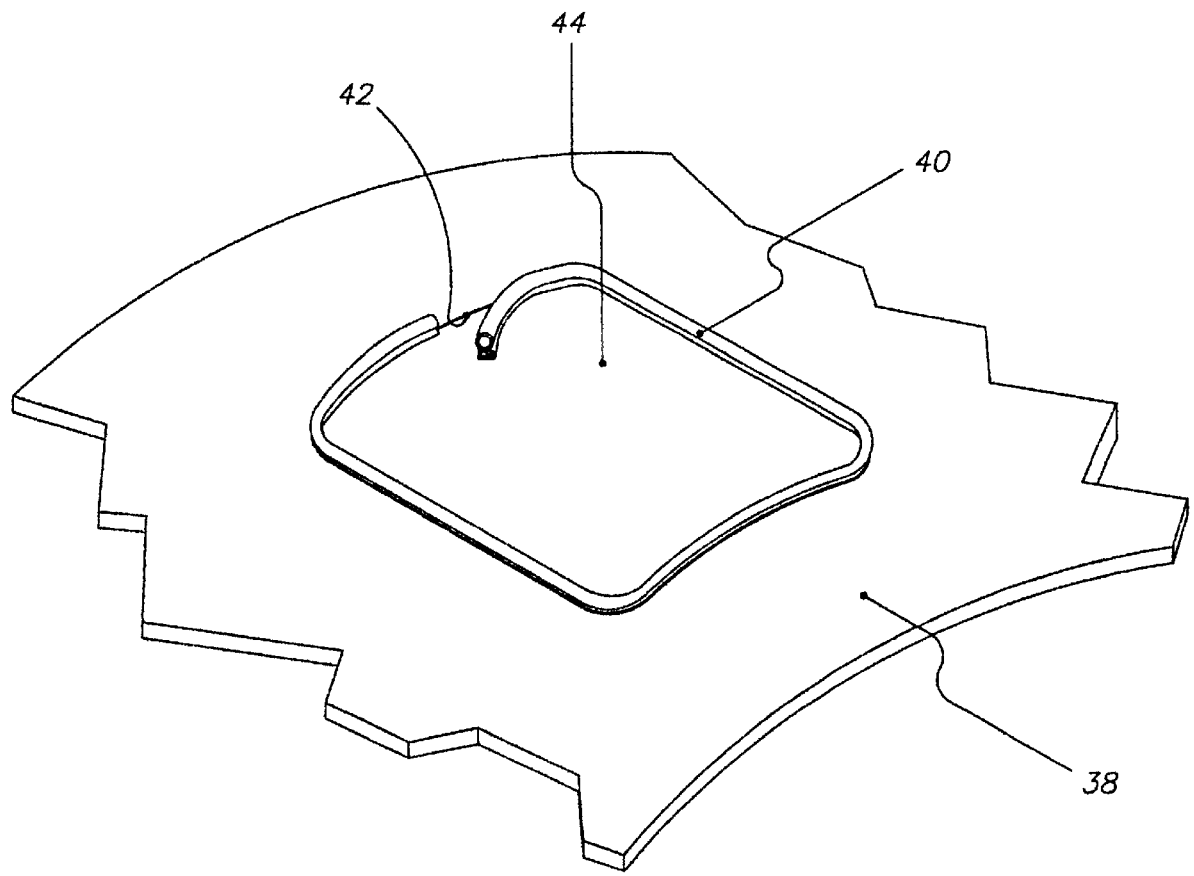
FIG. 3 illustrates a roof of a vehicle, and one step of the method of installing an escape hatch assembly in accordance with the present invention.
Figure 4:
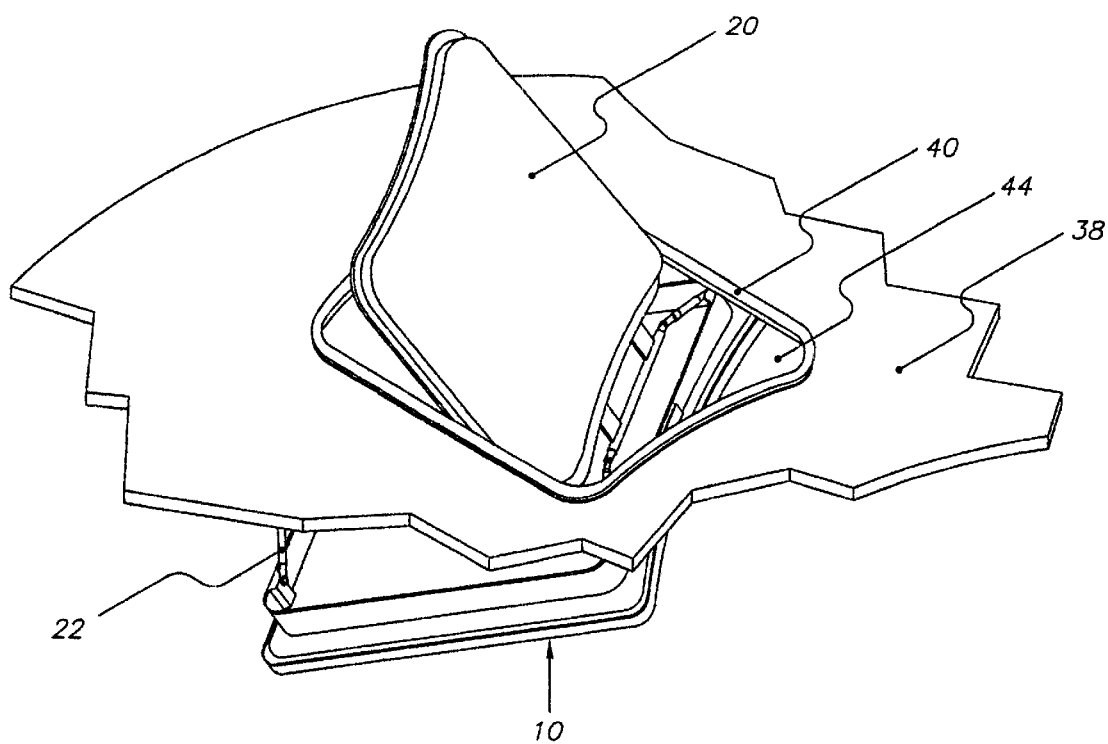
FIG. 4 illustrates another step of the method of installing an escape hatch assembly in accordance with the present invention.

The present inventions also includes a unique and advantageous method of installing the escape hatch assembly 10 in the roof 38 of a vehicle as best illustrated in FIGS. 3–6. Preferably, the first step in the installation possess is illustrated in FIG. 3, and includes the step of attaching a sealing gasket 40 around the edge 42 of the upper surface of the vehicle roof 38 which defines a generally rectangular opening 44 in the roof 38. The sealing gasket 40 may be split, as illustrated in FIG. 3, in which case it is easy to install, and it is usually necessary to add an adhesive or the like between the abutting cut ends after the sealing gasket 40 has been installed to provide a complete seal around the entire periphery of the sealing gasket 40. However, in many applications, the sealing gasket 40 is preferably formed of one continuous strip of sealing material as illustrated in FIG. 4 to eliminate any gaps in the scaling gasket 40. In either case, it is preferred that the thickness of the sealing gasket be such that it extends above the surface of the roof of the vehicle so that it can be directly engaged by the escape hatch member 20 as will be discussed below. Additionally, a second sealing gasket 50 can be mounted directly on the bottom surface of the escape hatch member 20 as illustrated in FIG. 7, and it can be positioned to engage the top surface of the vehicle roof 38 directly to provide a seal therebetween, in which case the sealing gasket 40 may not be necessary, or it may engage the top surface of the sealing gasket 40 to provide an additional seal therebetween.

Next, as best seen in FIG. 4, the release handle 26 of the escape hatch assembly 10 is operated to release the escape hatch member 20 as described above, and the escape hatch member 20 is pivoted away from the frame 12 about the hinges 36. The escape hatch assembly 10 is then moved upwardly through the opening 44 in the roof 38 from the inside of the vehicle. The escape hatch assembly 10 is moved into sealing engagement with the gasket 40, after which the escape hatch member 20 is pivoted back to its closed position, or vice versa. In this position, the escape hatch assembly 10 is temporarily, and somewhat loosely, held in place in the roof opening 44 by the escape hatch member 20 resting on the sealing gasket 40 at the top surface of the vehicle roof 38, and, by properly operating the hinge mechanisms to pull the frame 12 upwardly until the flange 18 is moved into contact with the inside surface of the vehicle roof 38, the escape hatch assembly 10 can be more securely held in place in preparation for the next step in the installation procedure.

Figure 6:
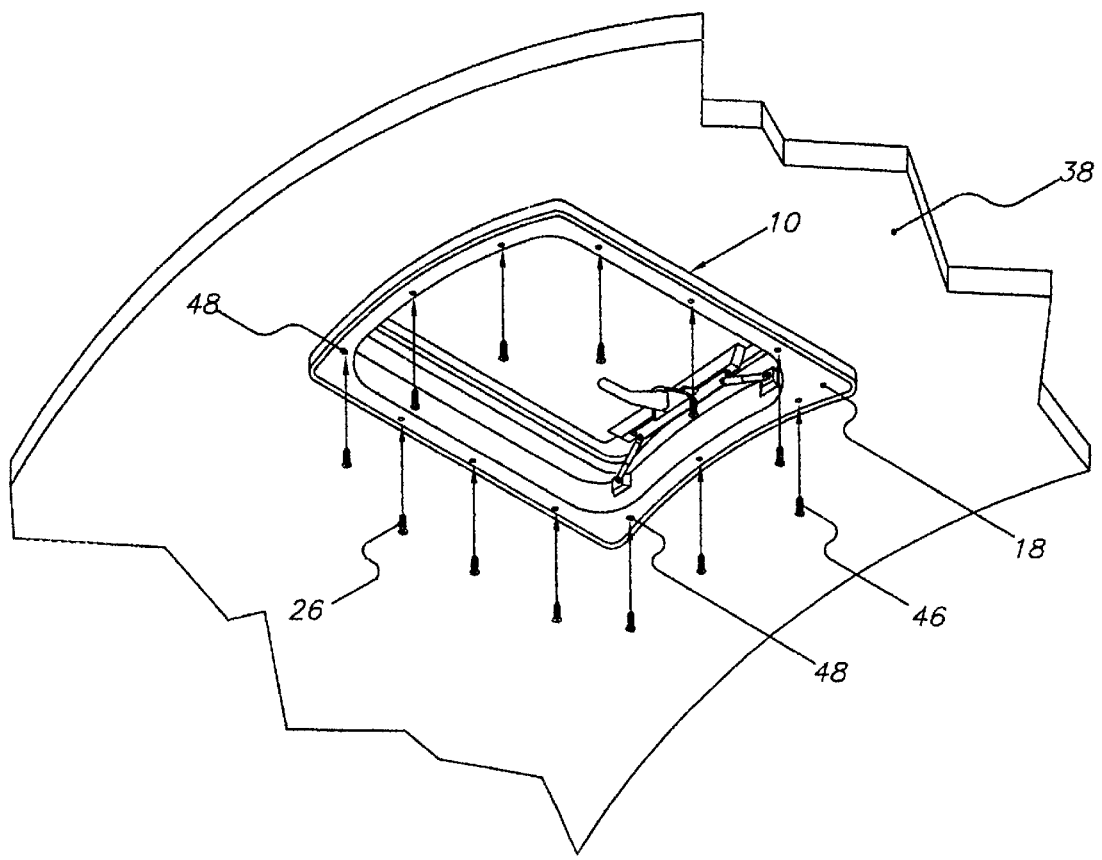
FIG. 6 illustrates another step of the method of installing an escape hatch assembly in accordance with the present invention.
Figure 7:
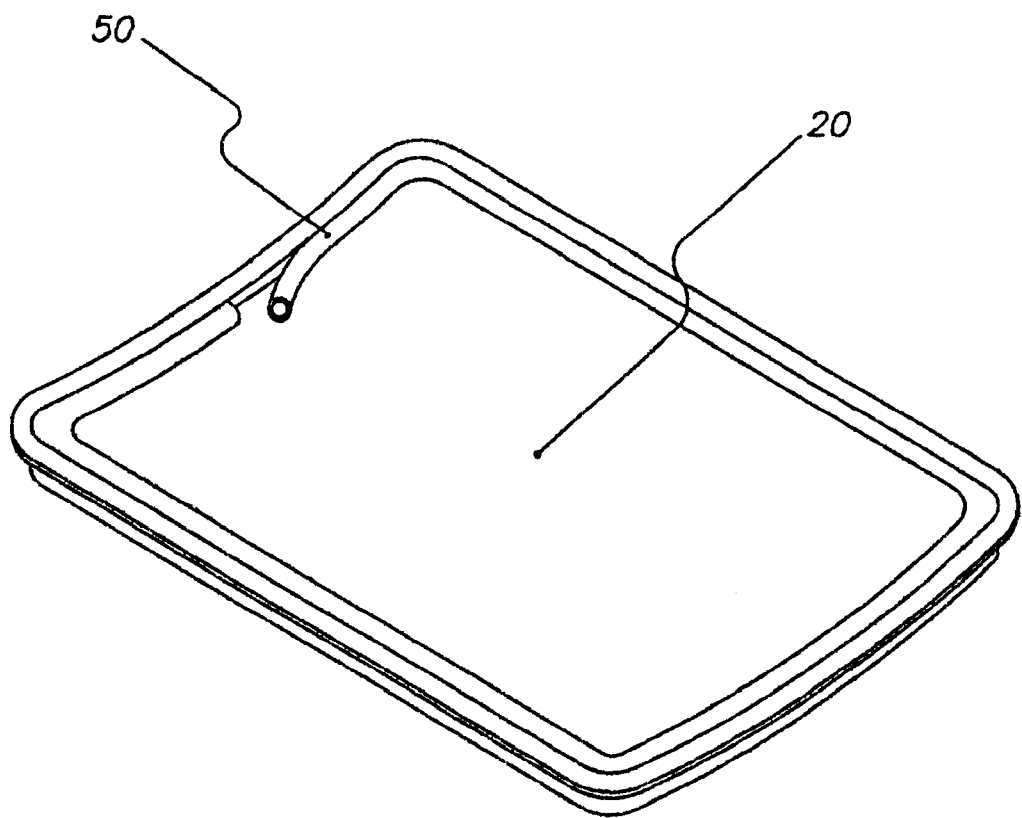
FIG. 7 illustrates an alternate embodiment of the escape hatch member with a sealing gasket attached directly thereto.

Thereafter, as best illustrated in FIG. 6, the installer secures the flange portion 18 to the inside surface of the vehicle roof 38 using a plurality of conventional attachment elements 46, which may be screws, rivets, or other known method of attaching one member to another, and which are inserted through openings 48 formed in the flange portion 18. Since the flange portion 18 is connected to the inside surface of the roof 38, it is not necessary to have the separate trim element that is usually required in conventional escape hatch assemblies, which is one of the features of the present invention. As discussed above, the flange 18 is formed with a curvature corresponding generally to the curvature of the inside of the vehicle roof 38 so that it will abut evenly with such inside surface to provide a neat appearance. Also, after the escape hatch assembly has been installed, it is preferred that the escape hatch member 20 will, in its closed position, directly engage the sealing gasket 40. Since the escape hatch member 20 is provided with a curvature corresponding to or tighter than the curvature of the vehicle roof 38 as described above, when it is pulled down into contact with the sealing gasket 40, a much better sealing engagement between the sealing gasket and the escape hatch member 20 is obtained. In many instances, as illustrated in FIG. 8., even greater sealing integrity is obtained by making the curvature of the escape hatch member 20 slightly tighter than the curvature of the vehicle roof 38 (e.g. a curvature having a radius of ninety-two inches as compared with a radius of one hundred and two inches for the roof of the vehicle) because the forces pulling down the escape hatch member 20 to its closed position will create spring-like forces generally in the center portions of the front and rear edges of the escape hatch member 20 that increases the sealing contact with the sealing gasket 40.

It will be noted from the description above that all of the steps required to install the escape hatch assembly 10 can be done from inside the vehicle, and all of the steps can be carried out by one installer. For example, one installer can easily move the escape hatch assembly 10 up through the opening 44 as illustrated in FIG. 4, and since the roof hatch assembly 10 is thereafter temporarily held in place by the escape hatch member 20 resting on the vehicle roof 38, the sole installer can then secure the escape hatch assembly 10 to the roof of the vehicle using the attachment elements 46 without the need of another installer to hold the escape hatch assembly 10 in place while it is being secured.

Figure 8:
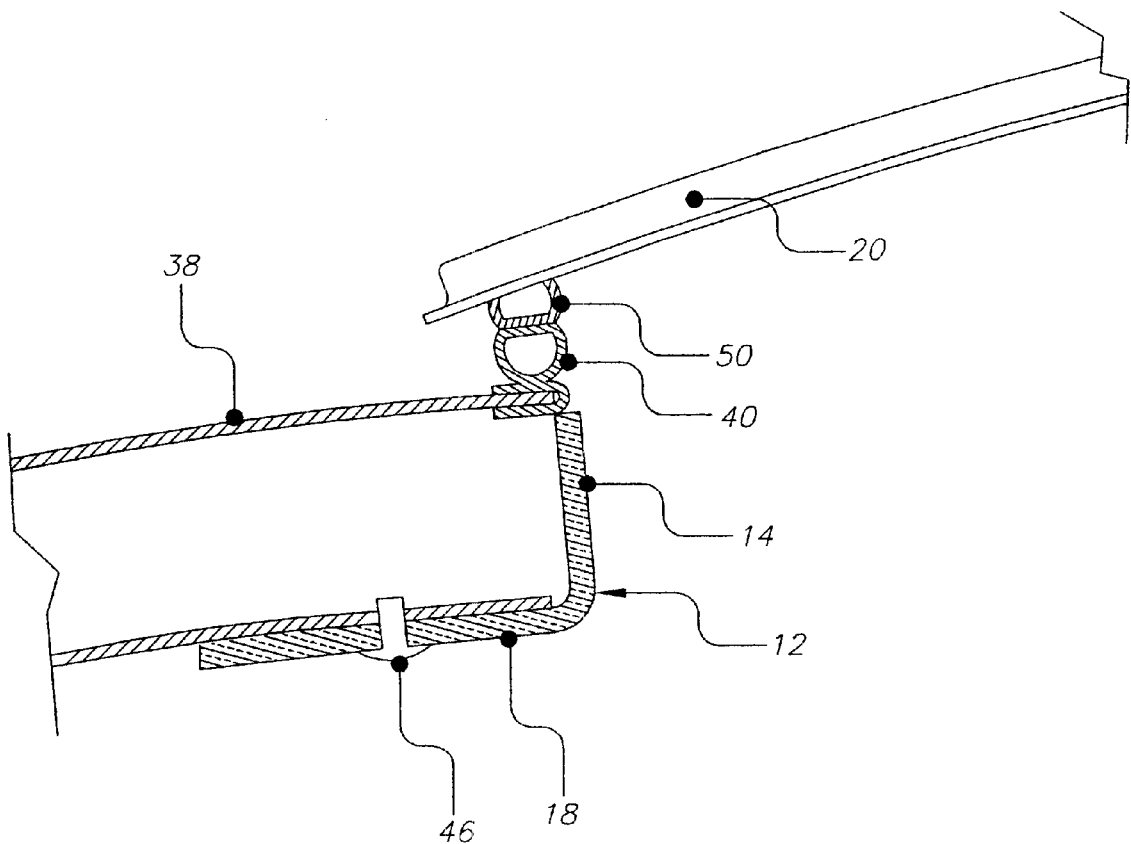
FIG. 8 is a detailed view illustrating the sealing arrangement for the escape hatch member.

Moreover, since the frame 12 is secured to the inside surface of the vehicle roof 38, and the upstanding wall portions 14 extend upwardly into the thickness of the vehicle roof 38, the upper edge of the upstanding wall portions 14 may engage the sealing ring or gasket 40 as illustrated in FIG. 8 to prevent moisture, debris or the like from entering the space between the sealing gasket 40 and escape hatch assembly 10, but even if the upstanding wall portions 14 do not engage the sealing gasket 40, it will nevertheless have a vertical extent that is less the thickness of the vehicle roof 38 between its inner and outer skins. Accordingly, even when the escape hatch member 20 is at its closed position directly in engagement with the sealing gasket 40 as described above, the profile or vertical extent of the escape hatch assembly 10 above the top surface of the vehicle roof 38 is less than one inch, which is considerably less than known escape hatch arrangements. If optional conventional add-ons are added to the basic escape hatch assembly 10, such as power fans, static vents, and power actuators (not shown), the total vertical height of the escape hatch assembly 10 above the top surface of the vehicle roof 38 may exceed one inch, but it will still be substantially less than conventional escape hatch assemblies which have corresponding add-ons. Finally, it will be noted that once the escape hatch assembly 10 is installed as described above, none of the components thereof protrude lower than the flange portion 18 and into the interior of the vehicle where they could present a safety hazard for passengers in the vehicle.

It will therefore be readily appreciated that the present invention not only offers a safer escape hatch assembly 10 which is less likely to be damaged if the vehicle should roll over onto its roof and is less likely to be struck by structures frequently encountered by vehicles as described above, but the escape hatch assembly 10 can also be quickly and easily installed in the vehicle roof 38 in a shorter period of time and with less labor than that required by known escape hatch arrangements. Another significant safety feature offered by the present invention is the fact that no workmen are required to be on top of the vehicle during the installation of the escape hatch assembly 10, whereas in conventional installation procedures, workmen are exposed to greater risks as they work from the top of the vehicle and they may even be required to wear safety harnesses or similar safety equipment.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. An escape hatch assembly mountable in an opening in the roof of a vehicle, such escape hatch including
    (a) a frame member having an egress opening defined by upstanding side walls that are arranged to extend upwardly, and having a flange member extending outwardly from the lower portion of said frame member and arranged to abut the inside surface of the roof of the vehicle;
    (b) attachment means for securing the frame member to the inside surface of the roof of the vehicle; and
    (c) an escape hatch member attached to the frame member for movement between a closed position at which the escape hatch member closes the egress opening in the frame member, and an open position spaced from the frame sufficiently to permit egress of persons through the egress opening in the frame member.

2. An escape hatch assembly as defined in claim 1, wherein a resilient sealing member is arranged to extend around the opening in the roof of the vehicle.

3. An escape hatch assembly as defined in claim 2, wherein a second sealing member is attached to said escape hatch member and positioned to engage said first resilient sealing member when said escape hatch member is in its closed position.

4. An escape hatch assembly as defined in claim 2, wherein said resilient sealing member engages the upper end of said upstanding walls to provide a seal therebetween.

5. An escape hatch assembly as defined in claim 1, wherein a resilient sealing member is mounted on said escape hatch member for engaging the roof of said vehicle to provide a seal therebetween when said escape hatch member is in its closed position.

6. An escape hatch assembly as defined in claim 2, wherein said resilient sealing member engages said escape hatch member when it is in its closed position.

7. An escape hatch assembly as defined in claim 1, wherein the escape hatch member is attached to the frame member by a hinge mechanism that permits the escape hatch member to be pivoted between its closed and open positions.

8. An escape hatch assembly as defined in claim 1, wherein the flange member includes openings therein disposed to permit attachment screws to be screwed upwardly into the inside surface of the roof of the vehicle.

9. An escape hatch assembly as defined in claim 1, wherein the outward extent of the entire escape hatch assembly above the top surface of the roof of the vehicle does not exceed one inch.

10. An escape hatch assembly as defined in claim 2, wherein said escape hatch member is in direct sealing contact with said resilient sealing member in said closed position of said escape hatch member, and spaced from said upstanding walls of said frame member.

11. An escape hatch assembly as defined in claim 1, wherein said escape hatch member has a curvature corresponding generally to the curvature of the exterior surface of the roof of the vehicle.

12. An escape hatch assembly as defined in claim 1, wherein said escape hatch member has a curvature that is slightly tighter than the curvature of the exterior surface of the roof of the vehicle.

* * * * *